Sept. 19, 1961   L. B. ROCKLAND   3,000,753
EMULSIFIED WAX COMPOSITIONS
Filed Feb. 21, 1957
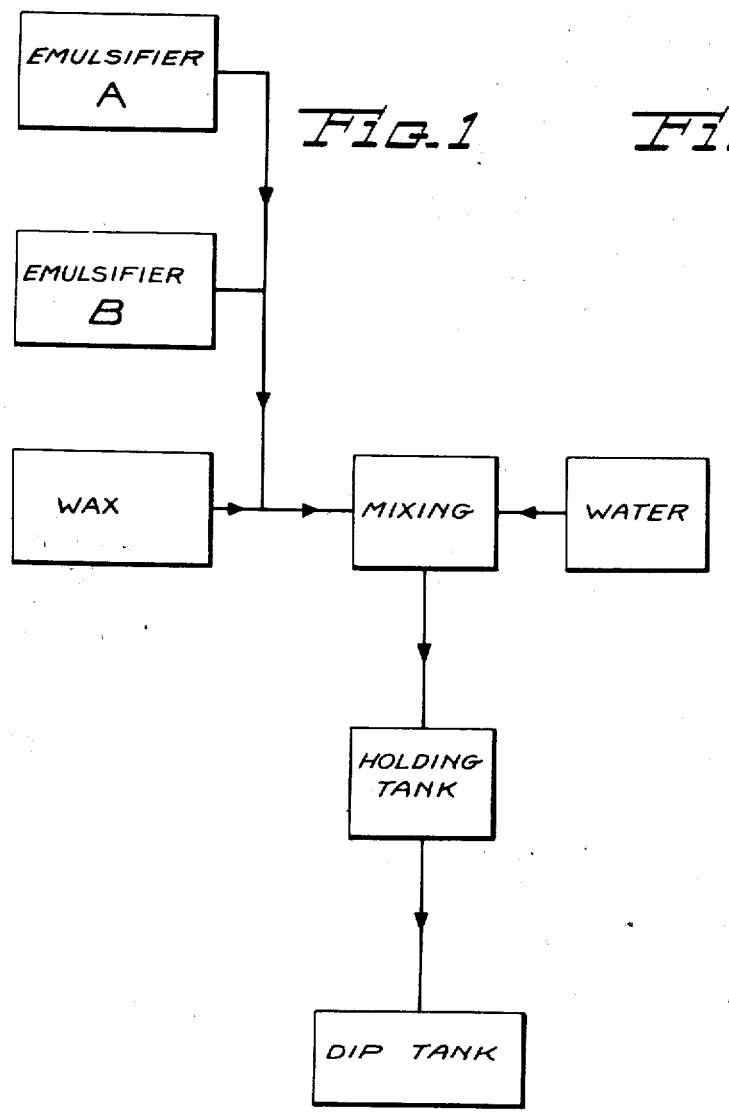
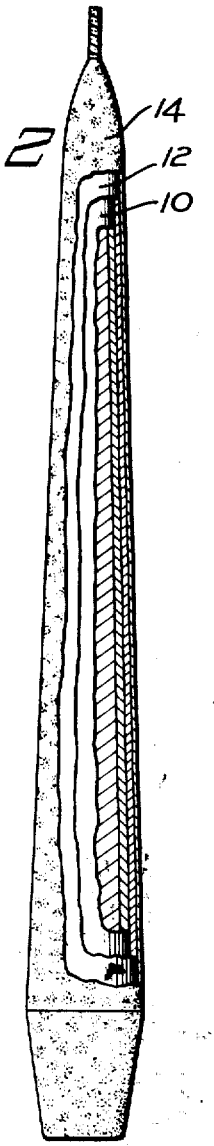
INVENTOR
LOUIS B. ROCKLAND
BY
ATTORNEYS United States Patent Office 3,000,753
Patented Sept. 19, 1961

3,000,753
EMULSIFIED WAX COMPOSITIONS
Louis B. Rockland, 600 Castano Ave.,
Pasadena 8, Calif.
Filed Feb. 21, 1957, Ser. No. 641,483
7 Claims. (Cl. 117—18)

This invention is directed to wax compositions of the emulsion type having uniquely high solids content which are stable and useful at ambient temperatures.

Waxes and waxlike compositions have wide commercial application both in the formation of manufactured articles such as candles, figurines and the like and containers or protective coatings as, for example, waxed paper, molds, waxed cups and waxed biological specimens. The utility of such materials, however, is reduced by the necessity of working heated and melted waxes, since, at ambient temperatures most natural waxes are plastic or solid. The application of heat is normally considered inherent in the working of such materials and the use of heat-melted waxes has numerous disadvantages. For example, many biological specimens are extremely sensitive to temperature over 100° F. and, therefore, cannot be coated or otherwise preserved by the application of a melted wax. Further, in the formation of wax molds and coatings, there is an appreciable dimensional change on solidification which precludes the use of melted waxes in precision molding or coating. Finally, hot waxes are highly inflammable and difficult to work by hand.

Accordingly, one of the principal objects of the present invention is to provide emulsified wax compositions which are usable at ambient temperatures.

A further object of the present invention is to provide emulsified wax compositions which may be applied to heat sensitive biological specimens.

A further object of this invention is to provide emulsified wax compositions which may be applied to diverse wax objects to form opaque wax coatings.

A further object of this invention is to provide emulsified wax compositions which may be molded into dimensionally stable forms.

Other objects and advantages of this invention it is believed will be readily apparent from the following detailed description of preferred embodiments thereof when taken in connection with the accompanying drawing in which FIG. 1 is a flow sheet illustrating the order or steps of preparing the compositions of the present invention. FIG. 2 is a side elevational view, partially broken away, of a candle produced in accordance with the present invention.

Briefly, this invention comprises wax compositions of the emulsion type having high solids content, relatively low viscosity and resistance to creaming at ambient temperatures. I have discovered that certain types of so-called oil-in-water emulsions will form hard, solid waxy coatings having, for given emulsions, a measurable and reproducible thickness when the continuous aqueous phase of the emulsion is permitted to evaporate or volatilize at ambient temperatures. Ambient temperautre, as used herein, may be defined as the temperature range from 65° F. to 85° F. In specifying this temperature range it is to be understood that the limits indicated are not critical but are merely illustrative of the fact that a workable wax composition may be obtained without heating the emulsion. Although the original emulsion is a thin fluid and completely dispersible in water or other compatible solvents at ambient temperature, after the dispersing solvent has been allowed to evaporate, the wax is insoluble in water at temperatures below the melting point of the mixture.

Generally, the wax compositions which are the subject of this invention are formed from water, ordinary waxes and surface active agents of the non-polar type. While oil-in-water emulsions are common, the solids content of such known emulsions is relatively low, being a maximum of 40 parts by weight of the emulsion. In accordance with this invention I have provided emulsions which contain from 40% to 70% solids. By the proper selection of the proportions and types of emulsifiers and waxes I have discovered that a relatively low viscosity, high solids content emulsion which is stable at ambient temperature may be formed.

Such high solids content wax emulsions have a wide variety of uses. For example, commercial types of dipped or molded candles are generally made from paraffin having a melting point between 133° and 138° F. and stearic acid. The stearic acid is used primarily to increase the opacity of the candle and to increase the melting point of the candle wax, thereby minimizing wilting or deformation of the candle in warm weather. The stearic acid content may be between 4% and 33%. Fancy candles of the highly decorated tapered or block candles may include white frosted waxes and various types of metallic powders, granules and silvered glasses as decorating medium. However, the stearic acid present in the candle wax has an unfavorable effect since it reacts with the decorative metals to form salts which destroy the color and sparkle of the decorations. Conventionally, the decorative layers are added to the candle by spraying onto the candle a resinous adhesive and applying the decorative elements to the wet adhesive. This thin layer of adhesive permits migration of the stearic acid into the decorative layer. By using the high solids content cold emulsions which are the subject of this invention, the undecorated candle is provided with a hard layer of stearic acid-free wax which is permitted to dry prior to the addition of the decorative layer. This layer of "cold wax" inhibits the migration of the stearic acid into the decorative layer, thereby minimizing unfavorable side reactions.

Biological and botanical specimens may be readily preserved by the use of such compositions. For example, flowers, leaves and entomological and pathological specimens may be coated with the emulsion at ambient temperature to provide a finite layer of hard, stable wax which will effectively exclude gases and other specimen damaging materials. Further, the hardened wax prevents dehydration and deformation of the biological specimens since the wax layer has a low vapor permeability. The thickness of the wax layer may be effectively controlled by controlling the viscosity of the emulsion. If thicker layers are desired, repeated coatings may be applied.

Since the emulsions which are the subject matter of this invention do not contract or expand on solidifying, dimensionally accurate wax molds or forms may be made by pouring the emulsion into a forming container and allowing the continuous phase to evaporate. On hardening the wax will faithfully follow the dimensions of the container permitting highly accurate dimensionally stable wax forms or molds to be prepared.

Finally, to the emulsions which are the subject of this invention may be added various colors, tones and scents by the addition of suitable dyes, pigments and fragrances. Since the emulsion is stable at ambient temperature and no heat is needed to convert the emulsion to a solid wax, the dyes, pigments and fragrances are not destroyed or changed in using the emulsion. In forming candles with such dyed and scented waxes by allowing successive or adjacent coatings to dry, a plurality of colors may be used with a minimum of cross-diffusing of one color layer into another.

As illustrated in FIG. 1, the method of forming the emulsions of the present invention includes the steps of admixing a selected wax with suitable emulsifiers, heating and mixing the resultant materials with the addition of water to form a homogeneous emulsion, allowing the mixture to cool without further agitation as by transferring it to a holding tank and finally transferring the resultant cooled mixture to a suitable dip tank or the like.

The following are specific examples of stable emulsions and method of their formation which are usable at ambient temperature. In these examples all proportions used represent parts by weight unless otherwise indicated.

*Example No. 1*

(1) 3.85 parts Emulsifier A
(2) 3.85 parts Emulsifier B
(3) 51.30 parts paraffin (M.P. 128°–132° F.)
(4) 41.00 parts water (1), (2) and (3) were melted together and brought to a temperature of 120° C. Water heated to about 90° C. was slowly added to this mixture with vigorous stirring. The mixture was then allowed to cool to ambient temperature without further agitation. The resulting emulsion was a white cream.

*Example No. 2*

(1) 3.0 parts Emulsifier A
(2) 3.0 parts Emulsifier B
(3) 40.0 parts paraffin (M.P. 143°–150° F.)
(4) 54.0 parts water The emulsifiers were combined with the melted paraffin and heated to 120° C. The water was heated to boiling and combined with the paraffin-emulsifiers using vigorous agitation. The mixture was stirred gently until the temperature of the mixture reached 65° C. The mixture was allowed to cool to ambient temperature without agitation. For use as a coating the final cooled emulsion may be diluted with water according to desired final thickness of wax. The resulting emulsion was a relatively viscous slightly thixotropic opaque dead white fluid.

*Example No. 3*

(1) 2.9 parts Emulsifier A
(2) 2.9 parts Emulsifier B
(3) 38.7 parts paraffin (M.P. 143°–150° F.)
(4) 55.5 parts water The emulsifiers were combined with the paraffin and brought to a temperature of 130° C. The water was heated to near boiling (95° to 99° C.) and combined with the molten waxes with vigorous agitation. The mixture was cooled slowly with gentle agitation to 66° C. and agitation halted. The mixture was then cooled rapidly to ambient temperature without agitation. The resulting emulsion was a water thin opaque white fluid especially useful for spray or dip coatings of biological specimens.

*Example No. 4*

(1) 25.0 parts Emulsifier A
(2) 12.5 parts Emulsifier C
(3) 12.5 parts Emulsifier B
(4) 50.0 parts Emulsifier D
(5) 1000.0 parts paraffin (M.P. 135°–137° F.)
(6) 1000.0 parts water (1), (2), (3), (4) and (6) were heated to 85° C. and were allowed to cool to 75° C. The paraffin, previously heated to 90° C. was slowly added to the aqueous solution with vigorous agitation. The resulting solution was allowed to cool to room temperature without stirring. The cooled emulsion was an opaque white creamy fluid.

*Example No. 5*

(1) 5.0 parts Emulsifier A
(2) 5.0 parts Emulsifier C
(3) 100.0 parts paraffin (M.P. 135°–137° F.)
(4) 70.0 parts water (1), (2) and (3) were melted together and brought to a temperature of 110° C. Water heated to about 90° C. was slowly added with vigorous stirring. The resulting mixture was allowed to cool to ambient temperature with gentle stirring. The cooled emulsion was a heavy white cream.

The following information provides a key to the identity of the surface active agents or emulsifiers in the foregoing examples:

Emulsifier A, trade name Span 40, a product of Atlas Powder Company, is a partial ester of palmitic acid. Typical structures are:

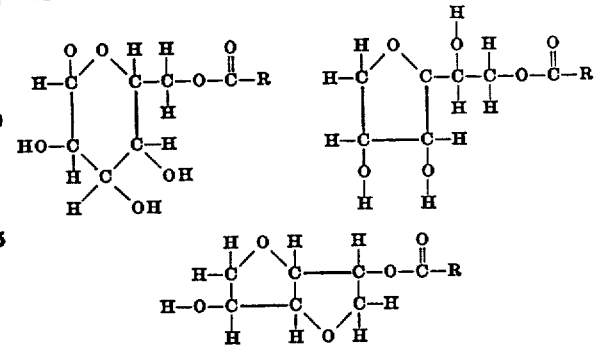

R is a palmitate residue.

Emulsifier B, trade name Tween 60, a product of Atlas Powder Company, is a compound similar to Tween 40 except that the principal fatty acid moiety is stearic rather than palmitric acid.

Emulsifier C, trade name Tween 40, a product of Atlas Power Company, is a polyoxyethylene sorbitan monopalmitate; typical structures are:

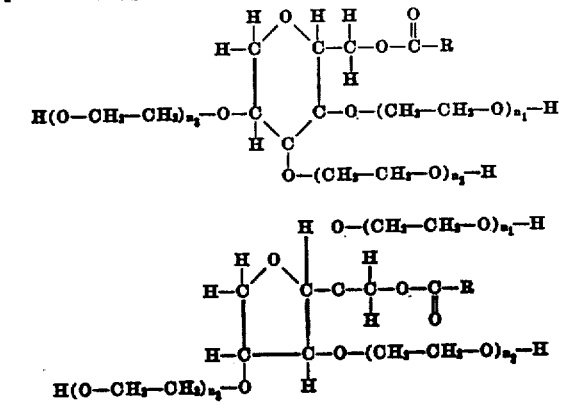

R is a palmitate residue.

Emulsifier D, trade name MYRJ 45, a product of Atlas Powder Company, is a polyoxyethylene stearate and may be represented by the following structure:

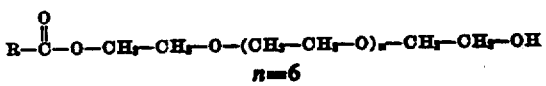

$n=6$

The following table is a summary of the above examples, indicating the percentage by weight of the various constituents:

| Constituent | Example number, percent by weight | | | | |
|---|---|---|---|---|---|
| | 1 | 2 | 3 | 4 | 5 |
| Emulsifier A | 3.85 | 3.0 | 2.9 | 1.18 | 2.75 |
| Emulsifier B | 3.85 | 3.0 | 2.9 | 0.59 | |
| Emulsifier C | | | | 0.59 | 2.75 |
| Emulsifier D | | | | 2.38 | |
| Paraffin | 51.30 | 40.00 | 38.70 | 47.63 | 55.60 |
| Water | 41.00 | 54.00 | 55.50 | 47.63 | 38.90 |
| Total Solids, percent | 59.00 | 46.00 | 44.50 | 52.37 | 61.10 |

The following are two examples of methods by which botanical specimens may be treated to preserve their natural characteristics:

Example No. 6

A fresh pink camellia blossom trimmed from a growing plant was immersed for about 5 seconds in a fluid wax emulsion as described in Example 3. The flower was removed from the emulsion bath, allowed to drain free of excess emulsion and dried in open air at room temperature for 24 hours. After drying the flower was uniformly coated with wax and retained the delicate contours, color and beauty of the original blossom. After a second treatment with the wax emulsion to increase the thickness of the waxy layer, the blossom appeared to be a prefect wax replica of the flower which retained its natural perfection for an indefinite period of time. To the emulsion described in Example 3 was added commercial red food dye in quantities sufficient to tint the emulsion to a shade comparable to a second camellia blossom and the camellia treated as above with the tinted emulsion. After drying and hardening of the wax, the natural coloring of many blossoms and the delicate veining and petal markings are visible through the transparent wax coating giving the flowers a very natural appearance. When fragrant blossoms, such as roses, were coated with cold wax it was observed that the natural odors of the blossoms permeated the wax film and gave the coated flowers the characteristic aroma of the blossom and which remained relatively undiminished for extended periods of time. In contrast to artificial wax flowers, the coated natural flowers had both a unique natural appearance and fragrance.

Natural green leaves tend to shrivel and change color or darken due to decomposition of chlorophyl and other natural processes when they are detached from the living plant. However, it has been observed that when freshly trimmed leaves are coated with "cold wax," shriveling and deformation of the tissue structure is prevented and undistorted, nonbrittle pliant leaves are obtained and which are preserved in essentially their original forms for an indefinite period of time.

Example No. 7

Green leaves were freshly trimmed from a growing camellia plant and immersed for 5 seconds in the wax emulsion described in Example No. 5 to which a quantity of oil soluble green dye sufficient to color the emulsion to a shade comparable to the selected leaves had been added. After three successive emulsion treatments, 24 hours apart, a firm, wax coating was obtained. The leaves retained their natural form and typical leaf markings which were visible through the transparent to translucent wax sheath. The leaves were pliant and retained this property under dehydrating conditions. The tendency for the leaves to brown and darken was not apparent since the green dye in the wax gave the leaves a natural green appearance. However, by inspection of segmented sections of the wax coated leaves, it was clear that the leaves had lost their natural green color. However, in spite of the discoloration of the vital tissues, the green dye present in the emulsion gave the leaves a natural green color.

The art of preserving flowers, leaves and other natural materials by coating with "cold wax" may be enhanced by the addition to the original emulsion of minute amounts of well known antioxidants, such as butylated hydroxy anisole, butylated hydroxy toluene, nordihydroguaiaretic acid, gum guaiac, tochopherols, gallic acid and its esters, escorbyl palmitate and other phenolic antioxidants such as catechol monobenzoate, p-tert.-butyl catechol and various other antioxidants including N,N'-Diphenyl-p-phenylenediamine, thiodipropionic acid, etc., fungicides such as sorbic acid, sodium benzoate, orthophenyl-phenol, phenol, diphenyl, chloro-phenol, etc., and other well known preservatives.

As a further part of the present invention a new and novel candle may be formed. As discussed above, a conventional tapered candle 10 may be provided with a hard layer 12 of stearic acid free wax and a thin layer 14 of such a wax to which decorative materials may be added. The following are examples of such a candle and methods of making the same.

Example No. 8

A 12 inch tapered candle containing 11% stearic acid and 89% paraffin (M.P. 133° to 138° F.) was immersed by dipping into an emulsion as described in Example 2. The treated candle was allowed to dry at room temperature for 2 hours. A second emulsion as described in Example 3 was then sprayed onto the dried candle. To the wet tacky second coating a gold colored bronze powder was added by spraying. The decorated candle was then allowed to dry for 3 hours. The coating was allowed to set and after hardening was artificially aged by heating in an oven at 125° F. for 30 days. After that time the outer wax coating was stripped off; no reaction between the stearic acid and the bronze powder was apparent. The outer coating was analyzed and found to be substantially free of stearic acid.

Example No. 9

A conventional cotton-braided candlewick was immersed successively in a cold emulsion as described in Example 4. The candle was dried between successive dippings by permitting the emulsion solvent to evaporate. The rate of dipping was in the order of 15 to 20 immersions per hour. After each successive dipping the candle was held vertically to permit the formation of a tapered effect. After 139 successive dipping operations the base of the candle was smoothed off and a 12 inch tapered candle was obtained.

While I have shown five emulsions which may be treated by the process which is the subject of this invention, it will be obvious to those skilled in the art that there is a wide range of aqueous emulsions which may be used advantageously. While in the examples given only paraffin waxes have been specified, other solid waxy materials may be similarly processed. These include low molecular weight polyethylenes and other synthetic waxes, fatty alcohols and their esters, fatty acids and their esters, long-chain aldehydes and ketones, beeswax, lanolin, carnauba wax, ouricuri wax, candelilla wax, Madagascar wax, Douglas fir wax, japan wax, apple cuticle wax, corn seed and sunflower seed waxes and jojoba wax.

In addition to the surface active agents specified in the examples, it has been determined, as has been indicated, that any nonpolar surface active agent would be satisfactory. While the wax content of the emulsion may vary between about 25% and 70% by weight and the surface active agent content is limited to from about 3% to 15% by weight, for any given emulsion, it is only necessary that the ratio be such that the emulsion is substantially stable at ambient temperatures.

Having fully described my invention, it is to be understood that I do not wish to be limited to the precise details

I claim:
1. A method of preparing a candle for decoration, the steps comprising: coating said candle with a layer of a fluid, high solids emulsified wax composition, said composition comprising a mixture of 35% to 60% by weight wax, at least two nonpolar surface active agents and water, one of said surface active agents being chosen from the group consisting of sorbitan esters of fatty acids having 12 to 18 carbon atoms, another of said nonpolar surface active agents being selected from the group consisting of polyoxyethylene derivatives of sorbitan esters of fatty acids having from 12 to 18 carbon atoms, the total by weight amount of said surface active agents being in the range from 10% to 5%, the by weight amount of said water being in the range of from 60% to 30%; removing the aqueous phase from said layer at ambient temperature to produce a dry wax layer on said candle; applying a second layer of said emulsified wax composition; applying decorative material to said second layer prior to the drying thereof whereby the said second layer acts as an adhesive base for the said decorative materials and drying said second layer.

2. The method as claimed in claim 1 wherein the wax is paraffin wax.

3. A decorated candle comprising: a main candle portion; a wax composition first layer on the surface of said main portion, said first layer comprising a mixture of 82% to 91% by weight wax and at least two nonpolar surface active agents, one of said surface active agents being selected from the group consisting of sorbitan esters of fatty acids having from 12 to 18 carbon atoms, and another of said surface active agents being selected from the group consisting of polyoxyethylene derivatives of sorbitan esters of a fatty acid having from 12 to 18 carbon atoms, the total by weight amount of said surface active agents being in the range of from 18% to 9%; and a decorated wax composition second layer, said second layer being of the same composition as the first layer.

4. A decorated candle as claimed in claim 3 wherein the wax is paraffin wax.

5. A method of preparing a candle for decoration, the steps comprising: coating said candle with a layer of an emulsified wax composition, said composition comprising a mixture of 35% to 60% by weight wax, at least two nonpolar surface active agents and water, said surface active agents being selected from the group consisting of partial sorbitan esters of stearic acid, partial sorbitan esters of palmitic acid, polyoxyethylene sorbitan monopalmitate and polyoxyethylene stearate, the by weight amount of said surface active agents being in the range of from 10% to 5%, the by weight amount of water being in the range of 60% to 30%; removing the aqueous phase from said layer at ambient temperature to produce a dry wax layer on said candle; applying a second layer of said emulsified wax composition; applying decorative material to said second layer prior to the drying thereof whereby the said second layer acts as an adhesive base for the said decorative materials and drying said second layer.

6. A decorated candle comprising: a main candle portion; a wax composition first layer comprising a mixture of 82% to 91% by weight paraffin wax and at least two nonpolar surface active agents, one of said surface active agents being selected from the group consisting of sorbitan partial esters of lauric, palmitic and stearic acids and another of said surface active agents being selected from the group consisting of polyoxyethylene derivatives of lauric, palmitic and stearic acids and of sorbitan partial esters of lauric, palmitic and stearic acids, the by weight amount of said surface active agents being in the range of from 10% to 5%; and a decorative wax layer on said first layer.

7. A process of preparing tapered candles, the steps comprising: successively dipping a combustible wick into an aqueous, low viscosity, fluid, high solids, emulsified colloidal wax suspension, said composition consisting essentially of a mixture of 30% to 60% by weight wax, at least two nonpolar surface active agents and water, one of said surface active agents being selected from the group consisting of sorbitan partial esters of lauric, palmitic and stearic acids and another of said surface active agents being selected from the group consisting of a polyoxyethylene derivative of sorbitan monolaurate, sorbitan monopalmitate and sorbitan monostearate, each of said surface active agents being present in equal amounts, the total by weight amount of said surface active agents being in the range of from 10% to 5%, the by weight amount of water being in the range of from 60% to 30%; successively evaporating the aqueous continuous phase from the coated wick between successive dippings to form multiple layers of hardened wax whereby a tapered candle is formed.

References Cited in the file of this patent

UNITED STATES PATENTS

| | | |
|---|---|---|
| 1,168,535 | Miles | Jan. 18, 1916 |
| 2,057,413 | Bridgeman et al. | Oct. 13, 1936 |
| 2,315,751 | Webber | Apr. 6, 1943 |
| 2,374,931 | Griffin | May 1, 1945 |
| 2,456,283 | Jefferson | Dec. 14, 1948 |
| 2,486,469 | French | Nov. 1, 1949 |
| 2,598,666 | Sesso et al. | June 3, 1952 |
| 2,684,948 | Cross | July 27, 1954 |
| 2,711,378 | Holzinger | June 21, 1955 |
| 2,817,225 | Weglin | Dec. 24, 1957 |

FOREIGN PATENTS

| | | |
|---|---|---|
| 664,427 | Great Britain | Jan. 9, 1952 |